United States Patent
Long et al.

(10) Patent No.: US 7,086,053 B2
(45) Date of Patent: Aug. 1, 2006

(54) METHOD AND APPARATUS FOR ENABLING THREADS TO REACH A CONSISTENT STATE WITHOUT EXPLICIT THREAD SUSPENSION

(75) Inventors: Dean R. E. Long, Boulder Creek, CA (US); Nedim Fresko, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 703 days.

(21) Appl. No.: 09/836,931

(22) Filed: Apr. 17, 2001

(65) Prior Publication Data

US 2001/0054057 A1 Dec. 20, 2001

Related U.S. Application Data

(60) Provisional application No. 60/211,030, filed on Jun. 12, 2000.

(51) Int. Cl.
*G06F 9/46* (2006.01)
*G06F 12/00* (2006.01)

(52) U.S. Cl. .......... 718/100; 711/3; 711/149; 711/152; 711/170

(58) Field of Classification Search ........ 718/100–108; 711/150, 3, 149–170; 717/141; 719/315
See application file for complete search history.

(56) References Cited

U.S. PATENT DOCUMENTS

| | | | | |
|---|---|---|---|---|
| 5,761,670 A | * | 6/1998 | Joy ............... 707/103 R |
| 5,842,016 A | * | 11/1998 | Toutonghi et al. .......... 718/106 |
| 5,895,494 A | * | 4/1999 | Scalzi et al. ............... 711/150 |
| 6,026,428 A | * | 2/2000 | Hutchison et al. ......... 718/108 |
| 6,067,604 A | * | 5/2000 | Ramachandran et al. ... 711/149 |
| 6,067,637 A | * | 5/2000 | Auer et al. .................. 714/26 |
| 6,167,424 A | * | 12/2000 | Bak et al. ................... 718/100 |
| 6,212,608 B1 | * | 4/2001 | Bak .............................. 711/152 |
| 6,243,788 B1 | * | 6/2001 | Franke et al. ................. 711/3 |
| 6,308,319 B1 | * | 10/2001 | Bush et al. ................. 717/141 |

(Continued)

FOREIGN PATENT DOCUMENTS

EP 1014264 A 6/2000

(Continued)

OTHER PUBLICATIONS

Kordale et al., "Concurrent Garbage Collection in Distributed Shared Memory Systems", IEEE, 1993, pp. 51-60.*

(Continued)

*Primary Examiner*—Meng-Ai An
*Assistant Examiner*—Jennifer N. To
(74) *Attorney, Agent, or Firm*—Beyer Weaver & Thomas LLP

(57) ABSTRACT

Methods and apparatus for enabling inconsistent or unsafe threads to efficiently reach a consistent or safe state when a requesting thread requests a consistent state are disclosed. According to one aspect of the present invention, a method for requesting a consistent state in a multi-threaded computing environment using a first thread includes acquiring a consistent state lock using the first thread, and identifying substantially all threads in the environment that are inconsistent. The state of the inconsistent threads is altered to a consistent state, and the first thread is notified when the states of the previously inconsistent threads have been altered to be consistent. Once the first thread is notified, the first thread releases the consistent state lock. In one embodiment, the method also includes performing a garbage collection after releasing the consistent state lock using the first thread.

9 Claims, 9 Drawing Sheets

U.S. PATENT DOCUMENTS

| | | | |
|---|---|---|---|
| 6,374,286 B1* | 4/2002 | Gee et al. | 718/108 |
| 6,418,460 B1* | 7/2002 | Bitar et al. | 718/108 |
| 6,438,548 B1* | 8/2002 | Grim et al. | 707/8 |
| 6,510,478 B1* | 1/2003 | Jeffords et al. | 710/200 |
| 6,523,059 B1* | 2/2003 | Schmidt | 718/100 |
| 6,539,464 B1* | 3/2003 | Getov | 711/170 |
| 6,546,443 B1* | 4/2003 | Kakivaya et al. | 710/200 |
| 6,594,683 B1* | 7/2003 | Furlani et al. | 718/102 |
| 6,772,367 B1* | 8/2004 | Tarafdar et al. | 714/11 |
| 6,848,109 B1* | 1/2005 | Kuhn | 719/315 |
| 6,951,018 B1* | 9/2005 | Long et al. | 718/100 |
| 6,952,827 B1* | 10/2005 | Alverson et al. | 718/104 |
| 7,013,454 B1* | 3/2006 | Bush et al. | 717/124 |
| 2001/0054057 A1* | 12/2001 | Long et al. | 709/108 |
| 2002/0129079 A1* | 9/2002 | Long et al. | 709/100 |
| 2003/0172054 A1* | 9/2003 | Berkowitz et al. | 707/1 |

FOREIGN PATENT DOCUMENTS

| WO | WO 00/10090 | 2/2000 |
|---|---|---|

OTHER PUBLICATIONS

Herlihy et al., "Lock-Free Garbage Collection for Multiprocessors", IEEE, 1992, pp. 304-311.*

Herlihy et al., "Lock-Free Garbage Collection for Multiprocessors", IEEE Inc, New York, vol. 3, No. 3, May 1992, pp. 304-311.

International Search Report in corresponding PCT application.

* cited by examiner

METHOD AND APPARATUS FOR ENABLING THREADS TO REACH A CONSISTENT STATE WITHOUT EXPLICIT THREAD SUSPENSION

CROSS REFERENCE TO RELATED APPLICATION

This application takes priority under U.S.C. 119(e) of U.S. Provisional Application No.: 60/211,030 filed Jun. 12, 2000 entitled, "METHOD AND APPARATUS FOR ENABLING THREADS TO REACH A CONSISTENT STATE WITHOUT EXPLICIT THREAD SUSPENSION" by Long et. al. which is incorporated by reference in its entirety.

BACKGROUND OF THE INVENTION

1. Field of Invention

The present invention relates generally to synchronizing threads in an object-based environment. More particularly, the present invention relates enabling inconsistent threads to become consistent when a requesting thread requests a consistent state.

2. Description of the Related Art

Within an object-based environment, threads are often used to satisfy requests for services. A thread may be thought of as a "sketch pad" of storage resources, and is essentially a single sequential flow of control within a computer program. In general, a thread, or a "thread of control," is a sequence of central processing unit (CPU) instructions or programming language statements that may be independently executed. Each thread in a multi-threaded environment has its own execution stack on which method activations reside. As will be appreciated by those skilled in the art, when a method is activated with respect to a thread, an activation is "pushed" on the execution stack of the thread. When the method returns, or is deactivated, the activation is "popped" from the execution stack. Since an activation of one method may activate another method, an execution stack operates in a first-in-last-out manner.

While maintaining multiple threads, a computing system may need to perform global operations which require synchronization, or control of all threads or a set of threads at a given time. One example of such a global operation is garbage collection. As will be appreciated by those skilled in the art, garbage collection is a method which allows memory storage associated with objects which are no longer alive to be automatically reclaimed.

Garbage collection generally occurs in two phases. A first phase typically involves identifying objects which are no longer needed or no longer in use, while a second phase renders the storage associated with the unneeded objects available for reallocation. An object in a program is needed, or alive, at a given time if a program may access the object in the future. When an object is such that it will not be accessed in the future, the object is considered to be unneeded or dead. Garbage collection algorithms, or "garbage collectors," typically consider an object to be dead substantially only when a program has abandoned all pointers to the object, making future access to the object impossible.

All locations of objects and all locations of reference pointers typically need to be known to perform a global operation such as a garbage collection. In a multi-threaded environment, a "stop" instruction is typically sent to all threads prior to performing a global operation. Once a stop instruction is sent to all threads, it is generally determined whether each thread is in a "safe" region or an "unsafe" region. A safe region is often considered to be a region of code through which a thread is processing, and in which pointers are not being manipulated. An unsafe region is often considered to be a region of the code through which a thread is processing, and in which pointers may be manipulated. Conventionally, all threads are typically suspended in order to evaluate each thread and to determine the disposition of each individual thread, i.e., to determine whether each thread is in a safe region or an unsafe region. When a thread is determined to be in an unsafe region, the thread is typically allowed to resume its operation, and is stopped at a subsequent point in time in order to attempt to suspend the thread at a safe region.

While thread suspension may be effective in some computing systems, typically, the more concurrent threads that are in use at any given time, the slower thread suspension progresses. Accordingly, suspension processes are very expensive to perform on many of computing systems which support many concurrent threads, due, for instance, to the fact that the speed associated with a system may be significantly compromised.

Therefore, what is desired is a relatively inexpensive method and apparatus for enabling a global safe-point operation to be performed. Specifically, what is needed is a method and an apparatus for enabling safe-point operations to be performed without the need to suspend all threads in a multi-threaded environment.

SUMMARY OF THE INVENTION

The present invention relates to methods and apparatus for enabling inconsistent threads to efficiently reach a consistent state when a requesting thread requests a consistent state. According to one aspect of the present invention, a method for requesting a consistent state in a multi-threaded computing environment using a first thread includes acquiring a consistent state lock using the first thread, and identifying substantially all threads in the environment that are inconsistent. The state of the inconsistent threads is altered to a consistent state, and the first thread is notified when the states of the previously inconsistent threads have been altered to be consistent. Once the first thread is notified, the first thread releases the consistent state lock. In one embodiment, the method also includes performing a garbage collection after releasing the consistent state lock using the first thread.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In the following description, numerous specific details are set forth in order to provide a thorough understanding of the present invention. It will be apparent, however, to one skilled in the art that the present invention may be practiced without some or all of these specific details. In other instances, well known structures or operations have not been described in detail in order to not unnecessarily obscure the invention.

Defining consistent and inconsistent states within a multi-threaded computing environment allows substantially all threads to efficiently reach a consistent or safe state when a requesting thread requests a global operation which generally requires synchronization. Consistent states are more general than standard safe-points, and enable different types of consistent states to be defined, e.g., global or virtual machine consistent states and private or per-thread consistent states. By way of example, a garbage collection may be split into several consistent states such as a per-thread local-root state, a virtual machine global-root state, and a virtual machine object-move state.

The present invention enables a determination to be made as to which threads in a system are inconsistent, or "garbage collection unsafe," and cause them to reach a consistent, or "garbage collection safe," point without requiring all threads to be suspended. In one embodiment, inconsistent threads may be caused to reach a consistent point with very few synchronization operations.

The synchronization associated with a system which uses consistent and inconsistent states is similar in implementation to a readers/writer lock, which will be understood by those skilled in the art. Multiple inconsistent threads, or "readers," may be in existence when a requesting thread, or a "writer," requests a consistent state. The requesting thread may not obtain a consistent state until substantially all threads, or readers, are consistent. In one embodiment, operations associated with substantially all threads reaching a consistent state enable the inconsistent threads to operate more efficiently while slightly compromising the performance speed of the requesting thread. As allowing inconsistent threads to reach a consistent state generally occurs much more frequently that allowing a requesting thread to request a consistent state, the use of consistent and inconsistent states in accordance with the present invention increases the overall efficiency and performance of a multi-threaded computing environment.

Figure 1:
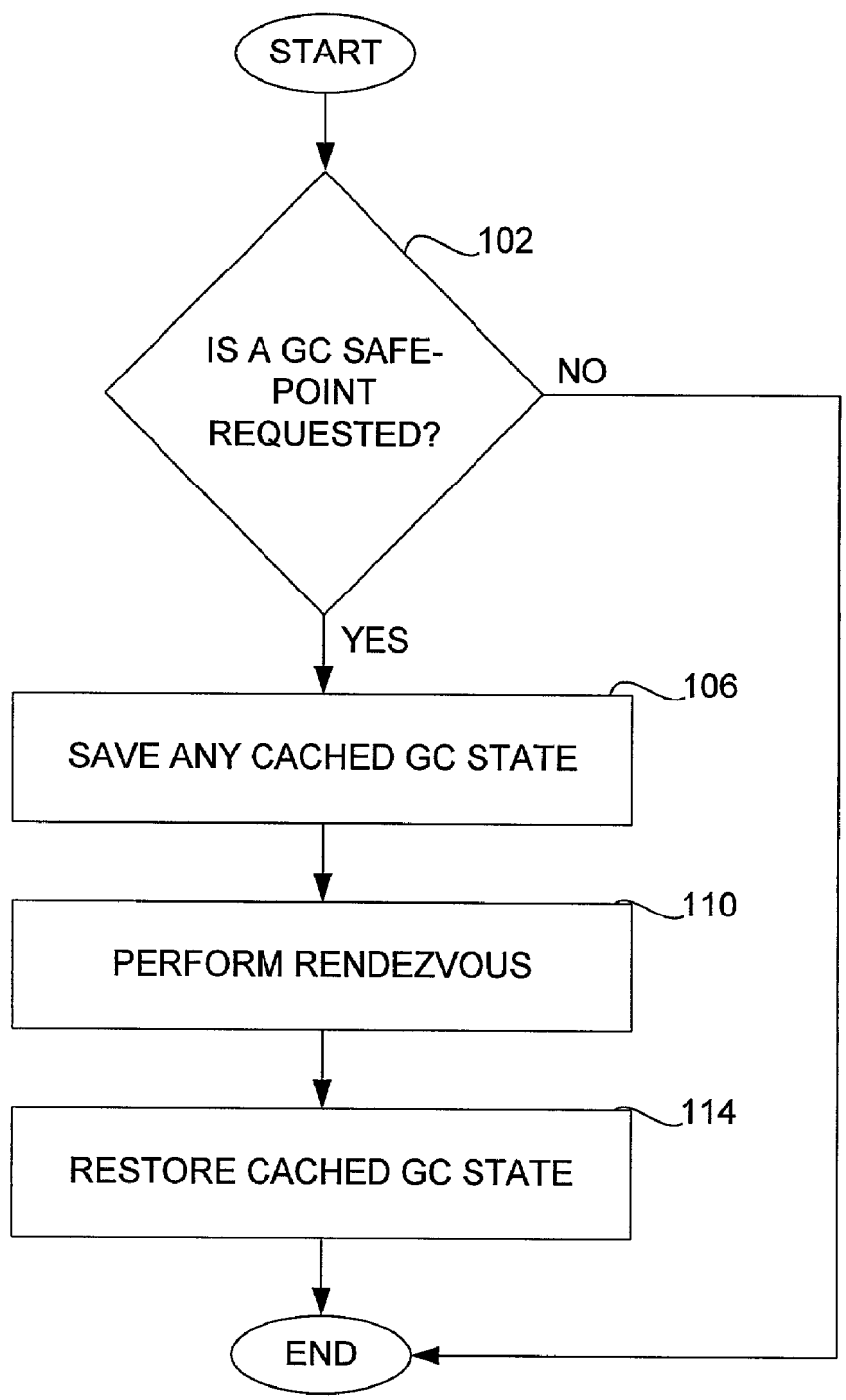
FIG. 1 is a process flow diagram that illustrates the steps associated with an unsafe thread reaching a check point in accordance with an embodiment of the present invention.

FIG. 1 is a process flow diagram which illustrates the steps associated with processing performed by an unsafe thread during a check point in accordance with an embodiment of the present invention. In general, a check point may be considered as a transition point for a thread. By way of example, if a thread is in the process of transitioning from a safe region to an unsafe region, the thread may be considered to be at a check point.

When a check point is reached, an unsafe thread, e.g., an inconsistent thread, makes a determination in step 102 regarding whether a garbage collection (GC) safe-point has been requested. A GC safe-point, in the described embodiment, is a safe-point requested to enable a global operation that requires synchronization, such as a garbage collection, to be performed. Herein and after, for consistency of discussion, a global operation that requires synchronization with generally be described as being a garbage collection operation. However, it should be appreciated that a garbage collection operation is only one example of a global operation that requires synchronization, i.e., the present invention may be implemented with respect to substantially any suitable global operation.

If it is determined in step 102 that a GC safe-point has not been requested, then the indication is that the thread may remain in its unsafe or inconsistent state, and the processing performed by an unsafe thread during a check point is completed. Alternatively, if it is determined in step 102 that a GC safe-point has been requested, then in step 106, any cached GC state is saved in a register or data structure which is visible to a garbage collector. After a cached GC state is saved, a rendezvous operation is called performed in step 110. In one embodiment, the rendezvous operation is called passing a "block" flag which is set to true, indicating that after the rendezvous operation, the thread will return to being unsafe and, therefore, the rendezvous operation should not return, e.g., "block," until the request has issued a resume command. A "block" flag may be arranged such that if a thread will be unsafe after performing a rendezvous operation, then the "block" flag will be set to true. Hence, the "block" flag may also be considered to be an "unsafe" flag. It should be appreciated that, in some embodiments, the use of a "block" flag may be considered to be unnecessary since the rendezvous operation may effectively determine the value associated with the "block" flag from the state of the thread.

A rendezvous operation is generally arranged to enable the thread to determine its status with respect to a requester thread, e.g., the thread which requested a check point. A rendezvous operation also synchronizes between a reader thread and a writer thread, and handles notification of a writer and blocking of the reader, if necessary. One example of a suitable rendezvous operation will be described below with reference to FIGS. 6A and 6B. Once the rendezvous operation performed in step 110 is completed, the cached GC state is restored or otherwise recached with respect to the thread in step 114, and the processing performed by an unsafe thread during a check point is completed.

Figure 2:
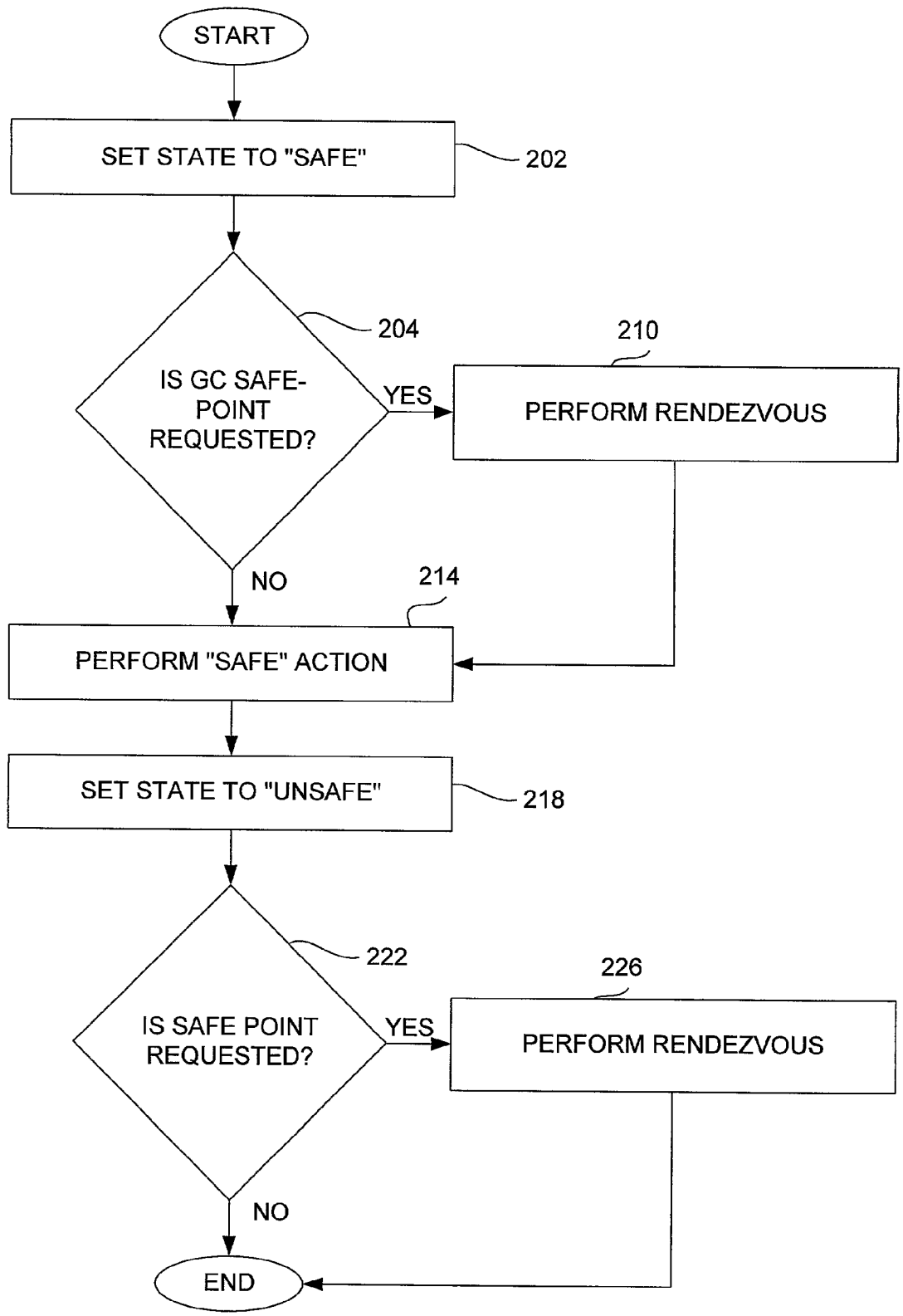
FIG. 2 is a process flow diagram that illustrates the steps associated with performing a safe action from the point-of-view of an unsafe thread in accordance with an embodiment of the present invention.

With reference to FIG. 2, the performance of a safe action while a thread is unsafe will be described in accordance with an embodiment of the present invention. The thread that is unsafe may be considered to be a "reader" thread or an otherwise inconsistent thread. In step 202, an unsafe thread sets its state to "safe." It should be appreciated that in order for the unsafe thread to set its state to "safe," the unsafe thread may first flush its state, e.g., its original unsafe state. After the state of the thread is set to "safe," a determination is made in step 204 as to whether a GC safe-point has been requested. In one embodiment, checking whether a GC safe-point has been requested involves determining whether a GC safe-point request flag has been set to indicate that a GC safe-point has been requested.

If it is determined that a GC safe-point has been requested, then a rendezvous operation is called in step 210, passing a block flag that is set to false to indicate that the thread was in an unsafe state and is currently considered to be in a safe state. The steps associated with performing a rendezvous operation will be described below with respect to FIGS. 6A and 6B. Once the rendezvous operation is called and completed, then, in step 214, a "safe" action such as a garbage collection is performed.

Returning to step 204, if it is determined that a GC safe-point has not been requested, then process flow proceeds directly to step 214 in which the "safe" action is performed. From step 214, process flow moves to step 218 in which the state of the thread is set back to its original unsafe state. After the state of the thread is set to "unsafe," then a determination is made in step 222 regarding whether a GC safe-point is requested. If a GC safe-point is not requested, then the unsafe thread is allowed to continue its processing. Alternatively, if it is determined that a GC safe-point is requested, then a rendezvous operation is called in step 226 passing a block flag that is set to true. Once the rendezvous operation is called and completed, then the unsafe thread is allowed to continue its processing.

Figure 3:
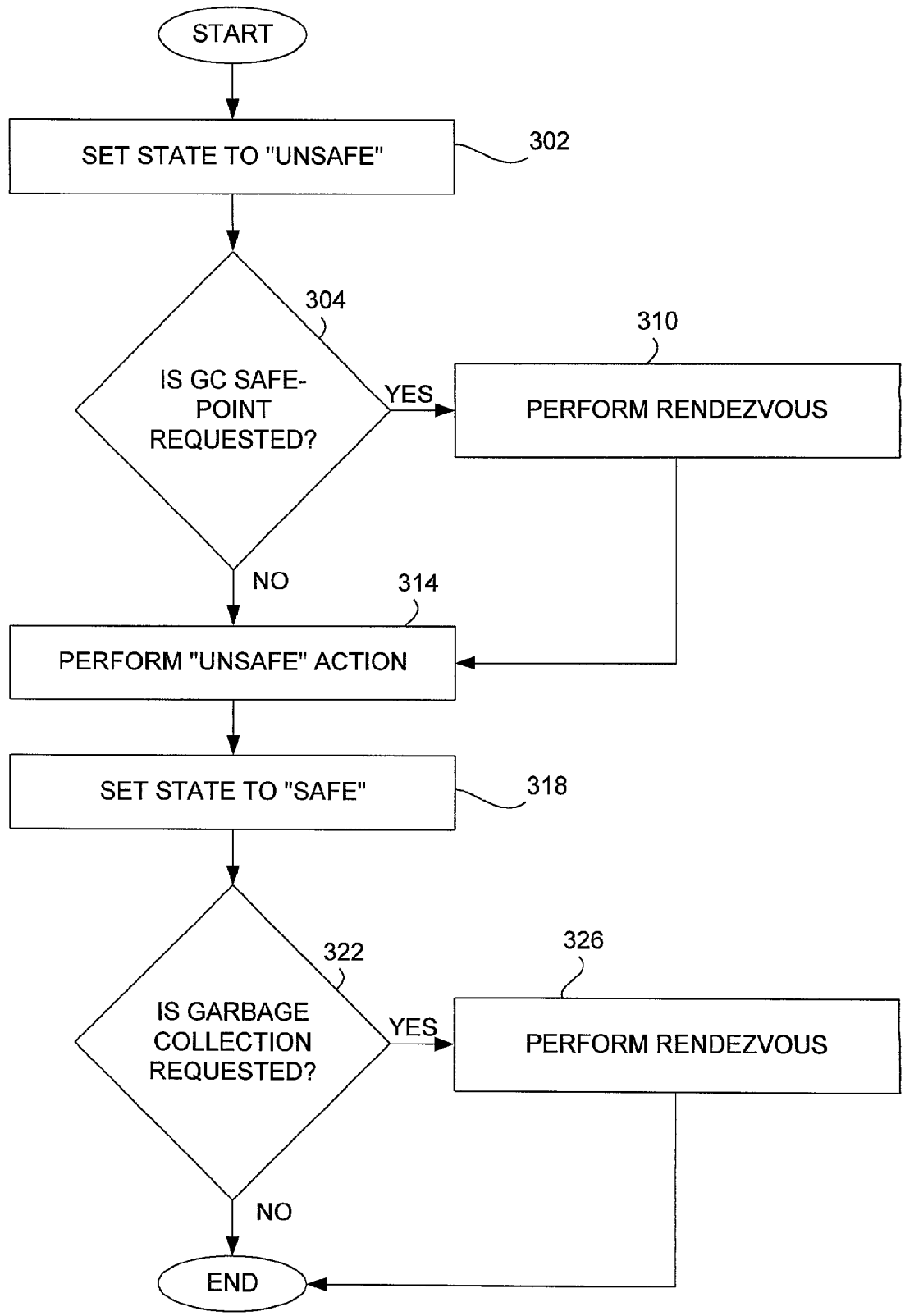
FIG. 3 is a process flow diagram that illustrates the steps associated with performing an unsafe action from the point-of-view of a safe thread in accordance with an embodiment of the present invention.

In some situations, an attempt may be made to perform an unsafe action while a thread, e.g., a reader thread, is "safe." FIG. 3 is a process flow diagram which illustrates the steps associated with accommodating such a situation in accordance with an embodiment of the present invention. In step 302, the state of the safe thread sets its state to "unsafe." Setting the state of the thread to "unsafe" may generally involve first flushing the state, e.g., original safe state of the thread. After the state of the thread is set to "unsafe," it is determined in step 304 whether a GC safe-point has been requested.

If it is determined that a GC safe-point has been requested, a rendezvous operation is called in step 310, passing a block flag that is set to true to indicate that the thread was in safe state and is currently considered to be in an unsafe state. The steps associated with performing a rendezvous operation will be described below with respect to FIGS. 6A and 6B. After the rendezvous operation is called and completed, an "unsafe" action is performed in step 314.

Alternatively, if it is determined that a GC safe-point has not been requested in step 304, then process flow proceeds directly to step 314 in which the "unsafe" action is performed. Once the unsafe action is performed, the state of the thread is set back to its original safe state in step 318, and a determination is made in step 322 regarding whether a GC safe-point is requested. If it is determined that a GC safe-point is not requested, then the safe thread is allowed to continue its processing. On the other hand, if it is determined that a GC safe-point is requested, then a rendezvous operation is called in step 326 passing a block flag that is set to false. Once the rendezvous operation is called and completed, then the safe thread is allowed to continue its processing.

Figure 4:
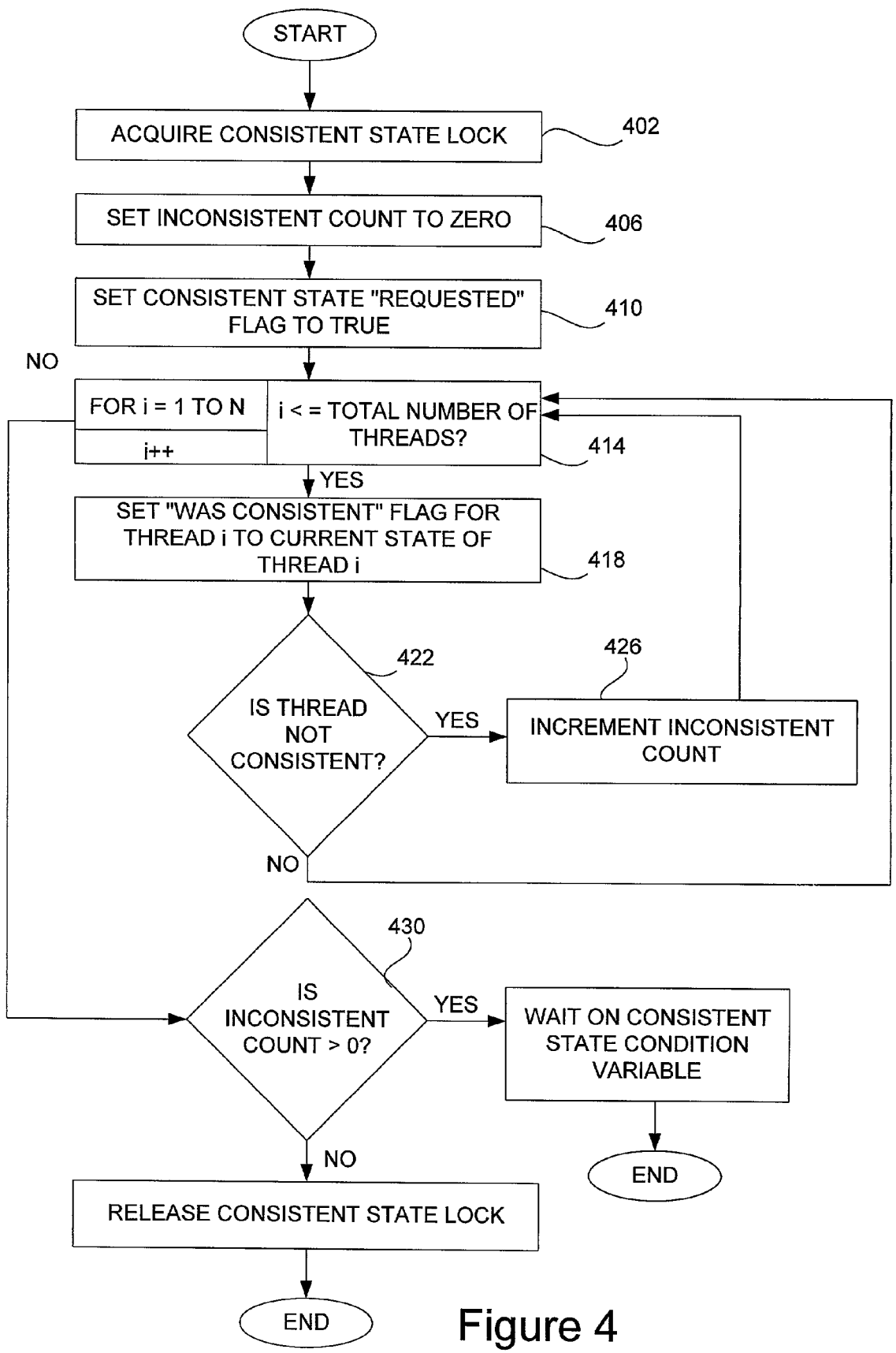
FIG. 4 is a process flow diagram that illustrates the steps associated with determining the consistency of substantially all threads in a multi-threaded environment using a thread which requests a safe-point in accordance with an embodiment of the present invention.

FIG. 4 is a process flow diagram which illustrates the steps associated with determining the consistency of substantially all threads in a multi-threaded environment using a thread which requests a safe-point in accordance with an embodiment of the present invention. In other words, FIG. 4 illustrates the steps associated with a writer thread which iterates over all threads, e.g., reader threads, to determine whether each thread is consistent or inconsistent upon reading a GC safe-point or a consistent state. The process of determining consistency begins at step 402 in which the thread, i.e., the requesting thread or the writer thread, obtains a consistent state lock.

Once the consistent state lock is obtained, an inconsistent count is substantially initialized to zero in step 406. In the described embodiment, the inconsistent count is arranged to count the number of threads which are to be transitioned from an inconsistent state to a consistent state. A consistent state "requested" flag is set to true in step 410 to indicate that a consistent state has been requested. It should be appreciated that a consistent state "requested" flag may either be a global flag or associated with each thread, indicating that a consistent state has been requested for that thread.

After the consistent state "requested" flag is set to true in step 410, the requesting thread begins to iterate over all threads in a multi-threaded environment except for itself in step 414. For each thread "i" which is not the requesting thread, a "was consistent" flag is set to indicate the current state for each thread "i" in step 418. In one embodiment, the "was consistent" flag for a thread "i" may be stored in memory associated with thread "i." In another embodiment, the "was consistent" flag for thread "i" may be stored in a substantially global data structure which has a value associated with each thread within the multi-threaded environment.

It should be appreciated that the "is consistent" value used for counting inconsistent threads is substantially the same as the "was consistent" value that was stored. Generally, the current state of the thread is not used, as it may have changed since the value was first read. In one embodiment, the consistent state of the thread may be read into a temporary variable, e.g., a local variable. This temporary variable may be stored into the "was inconsistent" location, and is used in a test to determine whether it is appropriate to increment the inconsistent count.

A determination is made in step 422 regarding whether thread "i" is consistent. Specifically, a determination is made as to whether thread "i" is not consistent using the "was consistent" flag associated with thread i. If the "was consistent" flag for thread "i" indicates that thread I is not consistent, then the inconsistent count, e.g., an unsafe count, is incremented in step 426, and the next thread "i" which is not the requesting thread is obtained in step 414. Alternatively, if thread "i" is consistent, then the inconsistent count is not incremented, and the next thread "i" which is not the requesting thread is obtained in step 414.

When it is determined in step 414 that all threads which are not the requesting thread have been obtained and studied, process flow moves to step 430 and a determination of whether the inconsistent count is greater than zero. In other words, it is determined in step 430 whether there are any inconsistent threads within a system. If it is determined that there are inconsistent thread within the system, i.e., that that inconsistent count is greater than zero, then in step 434, the requesting thread waits on a consistent state condition variable, e.g., consistent state variable W. As will be described below with respect to FIGS. 6A and 6B, when the inconsistent count has been decremented to zero, the requesting thread is notified.

After the wait on the consistent state condition variable is completed, i.e., after the requesting thread receives a notification, then process flow returns to step 430 in which a determination is made as to whether the inconsistent count is still greater than zero. When it is determined that the inconsistent count is not greater than zero, the indication is that substantially all threads in a multi-threaded system are consistent. Accordingly, the requesting thread releases the consistent state lock in step 438, and the process of determining consistency is concluded.

Figure 5:
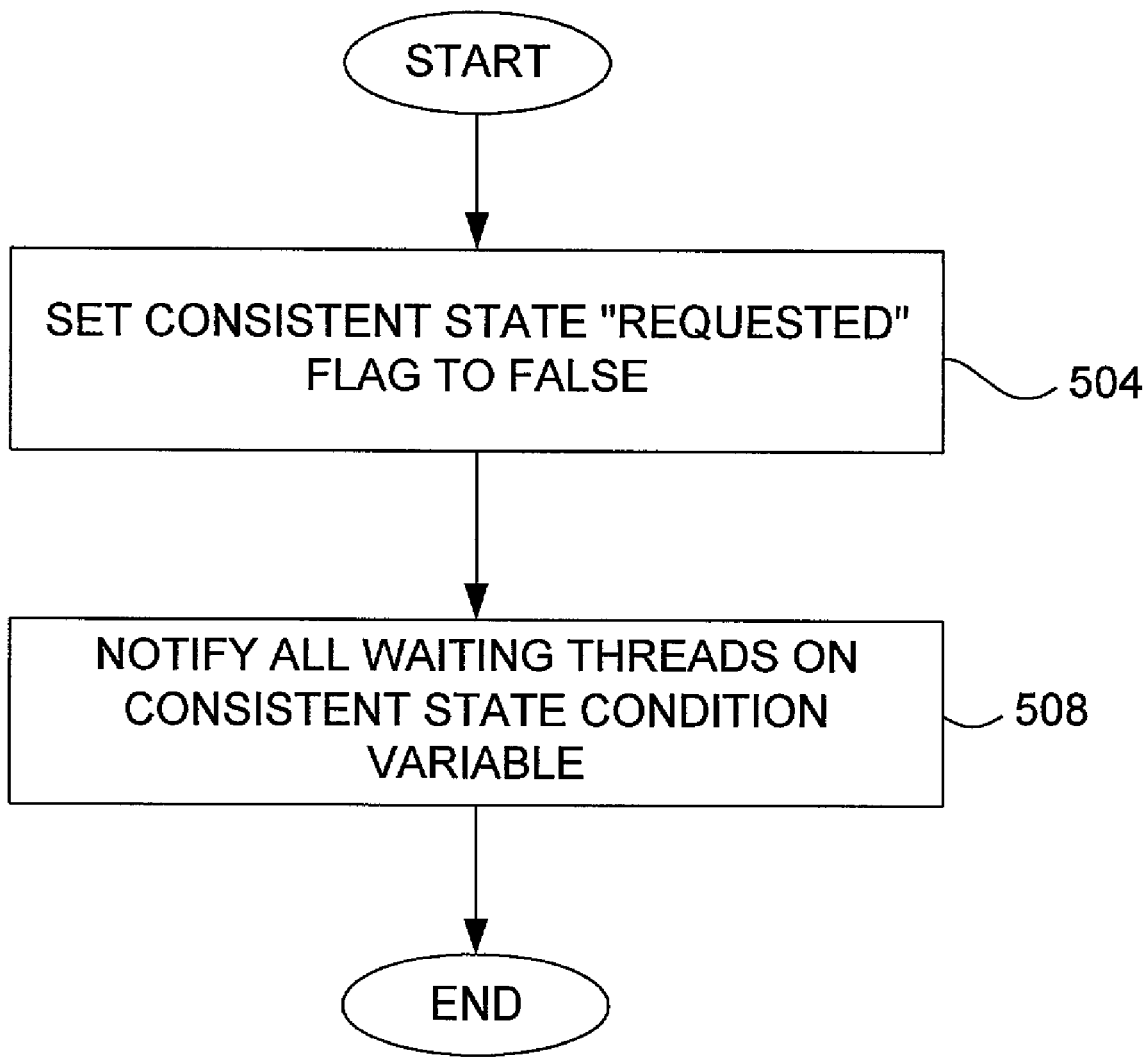
FIG. 5 is a process flow diagram that illustrates the steps associated with resuming operations from a consistent state in accordance with an embodiment of the present invention.

Once substantially all threads in a multi-threaded system are determined to be in a consistent state, then a garbage collection, or other global operation which uses thread synchronization, may be performed. After a garbage collection is performed, then all threads which have been effectively temporarily halter may be resumed. FIG. 5 is a process flow diagram which illustrates a method resuming operations from a consistent state in accordance with an embodiment of the present invention. The method begins at step 504 in which the consistent state "requested" flag that was set in step 410 of FIG. 4 is set to false. Once the consistent state "requested" flag is set to false, all waiting, e.g., reader, threads are notified on a consistent state condition variable R in 508. The notification on the consistent state condition variable is intended to indicate to each waiting thread, which may be blocking, that the thread may resume operation.

Figure 6A:
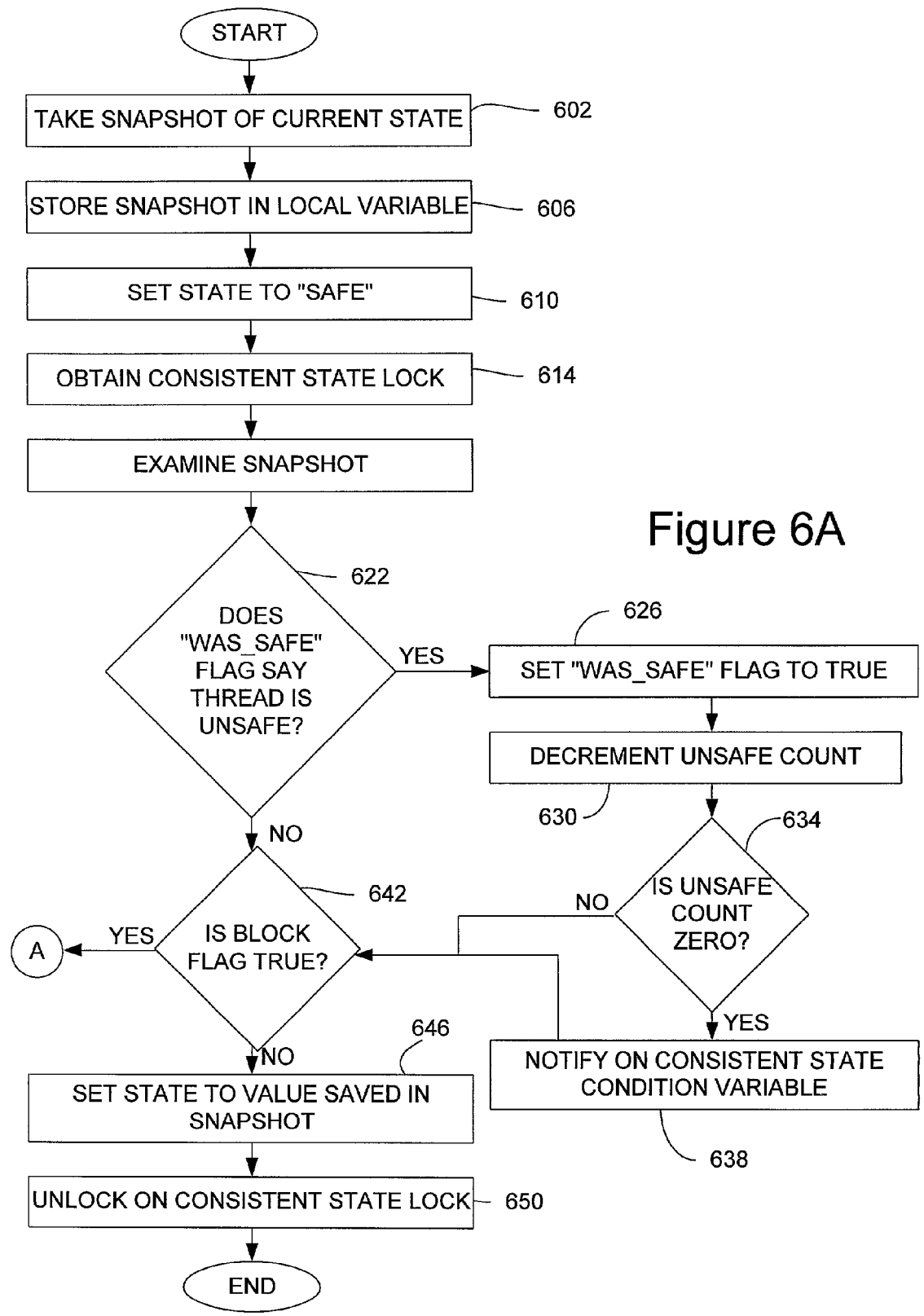
FIGS. 6A and 6B are a process flow diagram that illustrates the steps associated with performing a rendezvous operation, e.g., step 110 of FIG. 1, in accordance with an embodiment of the present invention.
Figure 6B:
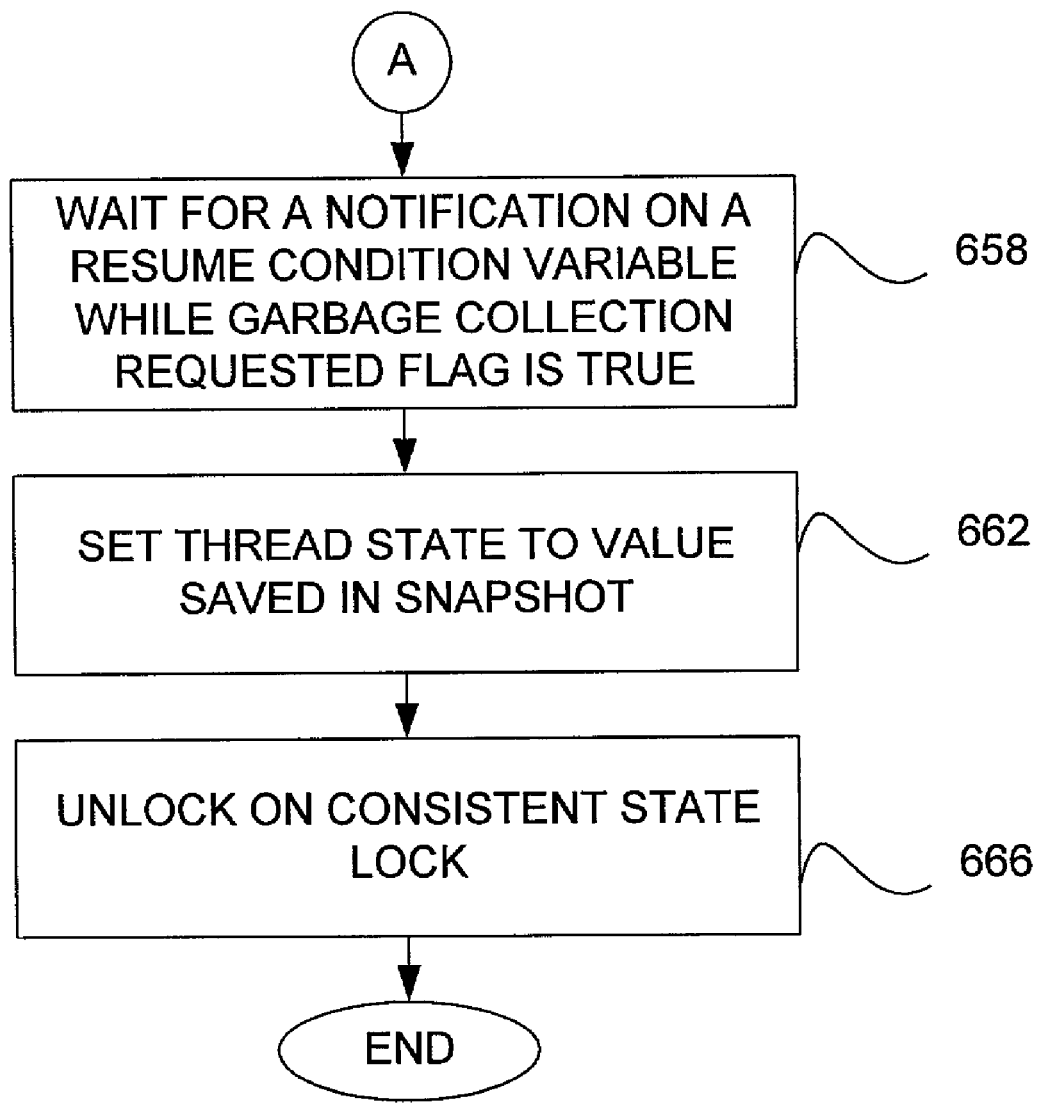

As previously mentioned, a rendezvous operation is generally arranged to enable a thread, e.g., a reader thread, to determine its status with respect to a requestor thread, e.g., a writer thread or a thread which requests a check point or a consistent state. FIGS. 6A and 6B are a process flow diagram which illustrates the steps associated with performing a rendezvous operation, as for example the rendezvous operations of step 110 of FIG. 1, steps 210 and 226 of FIG. 2, and steps 310 and 326 of FIG. 3, in accordance with an embodiment of the present invention.

A rendezvous operation begins at step 602 in which a snapshot is taken of the current state of the "current" thread, i.e., the thread which called the rendezvous operation. The snapshot may include a boolean value which indicates whether or not the thread was consistent and. In general, the boolean value is substantially the same as the "was consistent" value described above. In step 606, the snapshot is stored in a local variable that is associated with the thread. The local variable may be stored in a global data structure which has a value associated with each thread within a multi-threaded environment. Alternatively, the local variable may be stored within the thread, or may be stored in a field within memory that is associated with the thread.

The state of the thread is set to "safe" in step 610, after the snapshot is stored. A consistent state lock is then obtained in step 614. The acquisition of the consistent state lock indicates that the snapshot of the state of the thread is complete. After the consistent state lock is obtained, a determination is made in step 622 as to whether the "was_safe" flag, which indicates whether the thread was in a safe state, indicates that the thread is unsafe. It should be appreciated that, in the described embodiment, the "was_safe" flag is the same as the "was consistent" flag described above.

If it is determined that the "was_safe" flag indicates that the flag is not unsafe, then a determination is made regarding whether a block flag which is passed as a parameter to the rendezvous operation is true in step 642. As described above, a "block" flag that is set to true may indicate that a thread has been "changed" from a safe state to an unsafe state.

If it is determined that the "block" flag is not set to true, then the state of the thread is set in step 646 to the value it had upon initiation of the rendezvous operation. That is, the state of the thread is set to the value that is saved within the snapshot. Once the state is set to the value stored in the snapshot, then the consistent state lock is released or unlocked in step 650, and the rendezvous operation is completed.

Alternatively, if it is determined in step 642 that the block flag is set to true, then the thread waits in step 658 for notification on a resume condition variable as long as a garbage collection requested flag, e.g., a garbage collection safe-point requested flag, is true. In other words, the thread waits for the requesting thread to notify it to resume operation. The resume condition variable is typically consistent state condition variable R of FIG. 5. Once notification is received, the state of the thread is set in step 662 to the value that is saved in the snapshot. Then, in step 666, the consistent state lock is unlocked, and the rendezvous operation is completed.

Returning to step 622 and the determination of whether the "was_safe" flag in the snapshot is unsafe, if it is determined that the "was_safe" flag in the snapshot is unsafe, then process flow proceeds to step 626 in which the "was_safe" flag of the thread is set to true. Setting the "was_safe" flag indicates that the thread is becoming safe and, further, that the requesting thread has accounted for the thread in its count of inconsistent or unsafe threads, i.e., the inconsistent count incremented in step 426 of FIG. 4. After the "was_safe" flag is set, the inconsistent or unsafe count is decremented in step 630, and a determination is made in step 634 as to whether the inconsistent or unsafe count is zero.

If it is determined that the inconsistent or unsafe count is zero, then the thread notifies the requesting thread on consistent state condition variable W in step 638. Once the notification is sent, process flow moves to step 642 and the determination of whether the block flag is true. Alternatively, if it is determined that the inconsistent or unsafe count is not zero, then no notification is sent on the consistent state condition variable that the requesting thread is waiting on, and process flow proceeds directly from step 634 to step 642 in which a determination is made as to whether the block flag is true.

Figure 7:
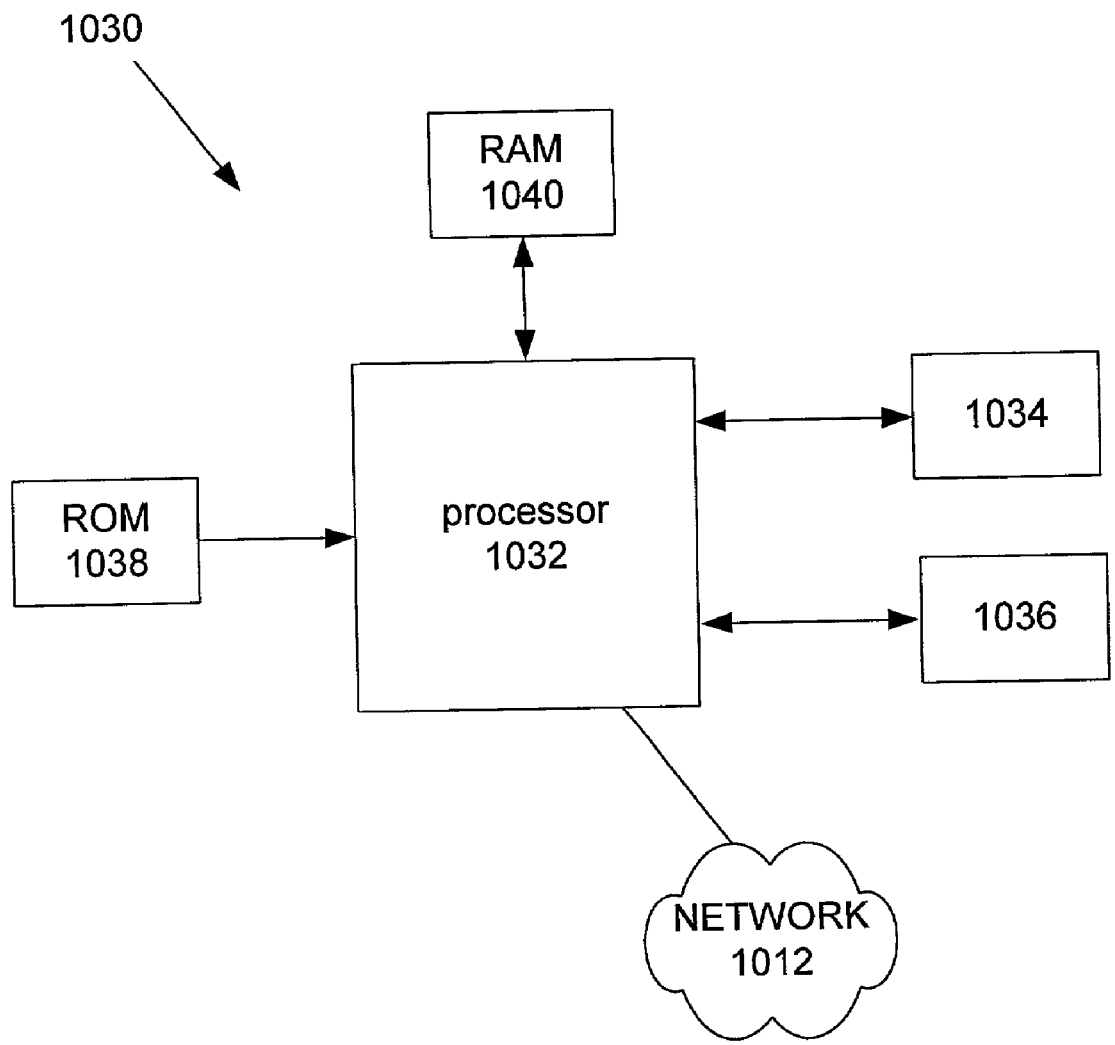
FIG. 7 is a diagrammatic representation of a general-purpose computer system suitable for implementing the present invention.

FIG. 7 illustrates a typical, general-purpose computer system suitable for implementing the present invention. The computer system 1030 includes at least one processor 1032 (also referred to as a central processing unit, or CPU) that is coupled to memory devices including primary storage devices 1036 (typically a read only memory, or ROM) and primary storage devices 1034 (typically a random access memory, or RAM).

Computer system 1030 or, more specifically, CPUs 1032, may be arranged to support a virtual machine, as will be appreciated by those skilled in the art. One example of a virtual machine that may be supported on computer system 1030 will be described below with reference to FIG. 8. As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Figure 8:
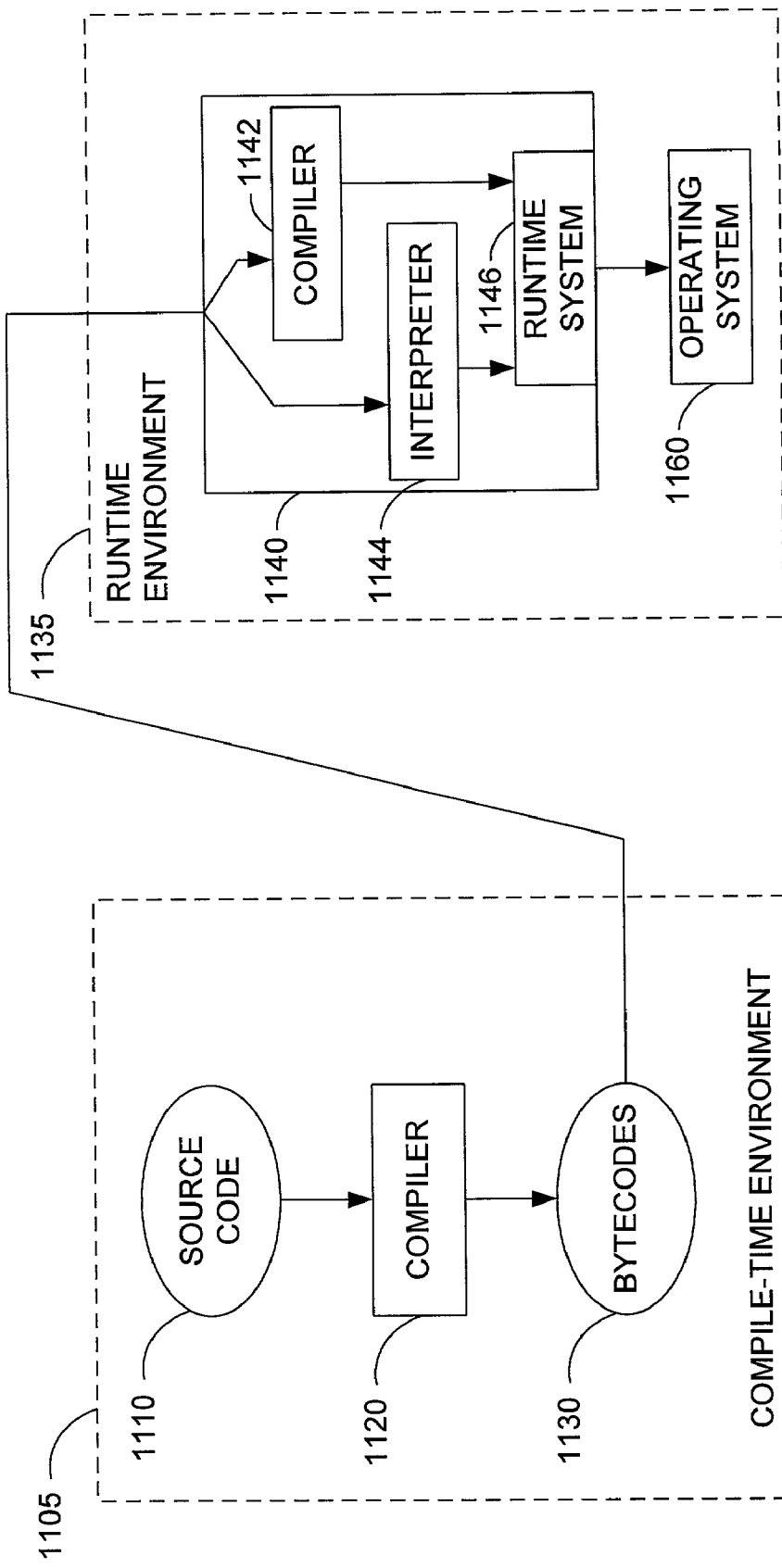
FIG. 8 is a diagrammatic representation of a virtual machine suitable for implementing the present invention.

As previously mentioned, a virtual machine may execute on computer system 1030. FIG. 8 is a diagrammatic representation of a virtual machine which is supported by computer system 1030 of FIG. 7, and is suitable for implementing the present invention. When a computer program, e.g., a computer program written in the Java™ programming language, is executed, source code 1110 is provided to a compiler 1120 within compile-time environment 1105. Compiler 1120 translates source code 1110 into bytecodes 1130. In general, source code 1110 is translated into bytecodes 1130 at the time source code 1110 is created by a software developer.

Bytecodes 1130 may generally be reproduced, downloaded, or otherwise distributed through a network, e.g., network 1012 of FIG. 7, or stored on a storage device such as primary storage 1034 of FIG. 7. In the described embodiment, bytecodes 1130 are platform independent. That is, bytecodes 1130 may be executed on substantially any computer system that is running on a suitable virtual machine 1140.

Bytecodes 1130 are provided to a runtime environment 1135 which includes virtual machine 1140. Runtime environment 1135 may generally be executed using a processor or processors such as CPUs 1032 of FIG. 7. Virtual machine 1140 includes a compiler 1142, an interpreter 1144, and a runtime system 1146. Bytecodes 1130 may be provided either to compiler 1142 or interpreter 1144.

When bytecodes 1130 are provided to compiler 1142, methods contained in bytecodes 1130 are compiled into machine instructions. In one embodiment, compiler 1142 is a just-in-time compiler which delays the compilation of methods contained in bytecodes 1130 until the methods are about to be executed. When bytecodes 1130 are provided to interpreter 1144, bytecodes 1130 are read into interpreter 1144 one bytecode at a time. Interpreter 1144 then performs the operation defined by each bytecode as each bytecode is read into interpreter 1144. That is, interpreter 1144 "interprets" bytecodes 1130, as will be appreciated by those skilled in the art. In general, interpreter 1144 processes bytecodes 1130 and performs operations associated with bytecodes 1130 substantially continuously.

When a method is invoked by another method, or is invoked from runtime environment 1135, if the method is interpreted, runtime system 1146 may obtain the method from runtime environment 1135 in the form of a sequence of bytecodes 1130, which may be directly executed by interpreter 1144. If, on the other hand, the method which is invoked is a compiled method which has not been compiled, runtime system 1146 also obtains the method from runtime environment 1135 in the form of a sequence of bytecodes 1130, then may go on to activate compiler 1142. Compiler 1142 then generates machine instructions from bytecodes 1130, and the resulting machine-language instructions may be executed directly by CPUs 1032. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

Although only a few embodiments of the present invention have been described, it should be understood that the present invention may be embodied in many other specific forms without departing from the spirit or the scope of the present invention. By way of example, by associating a consistent state with a state structure, it is possible to limit the number of threads which are allowed to be inconsistent at any given time. Limiting the number of threads that may be inconsistent may allow operations used to cause all threads to reach a consistent state to be bounded.

The steps associated with the various processes of the present invention may generally be widely varied, e.g., individual steps may be altered. In addition, steps may be removed, added, and reordered without departing from the spirit or the scope of the present invention. Therefore, the present examples are to be considered as illustrative and not restrictive, and the invention is not to be limited to the details given herein, but may be modified within the scope of the appended claims.

What is claimed is:

1. A computer-implemented method for requesting a consistent state in a computing environment using a first thread, the computing environment including multiple threads, the multiple threads including the first thread, comprising:

saving a snapshot of an indication of a state of the first thread and thereafter setting the state of the first thread to a safe state, wherein the indication of the state of which the snapshot is saved is an indication of whether or not the first thread was consistent;

acquiring a consistent state lock using the first thread;

identifying substantially all threads that are inconsistent, the inconsistent threads being included in the multiple threads;

altering the state of the substantially all threads that are inconsistent to a consistent state;

notifying the first thread when the state of the substantially all threads that are inconsistent have been altered to be consistent;

restoring the indication of the state of the first thread from the snapshot; and releasing the consistent state lock using the first thread.

2. A computer-implemented method as recited in claim 1 further comprising:

performing a garbage collection after releasing the consistent state lock using the first thread.

3. A computer-implemented method as recited in claim 2 further comprising:

notifying the substantially all threads that have been altered to be consistent that the garbage collection has been performed.

4. A computing apparatus having a computing device executing thereon, and having a program executing thereon for requesting a consistent state in the computing environment using a first thread, the computing device including multiple threads, the multiple threads including the first thread, the program executing thereon comprising:

program means for saving a snapshot of an indication of a state of the first thread and thereafter setting the state of the first thread to a safe state, wherein the indication of the state of which the snapshot is saved is an indication of whether or not the first thread was consistent;

program means for acquiring a consistent state lock using the first thread;

program means for identifying substantially all threads that are inconsistent, the inconsistent threads being included in the multiple threads;

program means for altering the state of the substantially all threads that are inconsistent to a consistent state;

program means for notifying the first thread when the state of the substantially all threads that are inconsistent have been altered to be consistent;

program means for restoring the indication of the state of the first thread from the snapshot; and program means for releasing the consistent state lock using the first thread.

5. A computing apparatus as recited in claim 4, the program executing thereon farther comprising:

program means for performing a garbage collection after releasing the consistent state lock using the first thread.

6. A computing apparatus as recited in claim 5, the program executing thereon further comprising:

program means for notifying the substantially all threads that have been altered to be consistent that the garbage collection has been performed.

7. A computer readable medium having embodied thereon a computer program for requesting a consistent state in a computing environment using a first thread, the computing environment including multiple threads, the multiple threads including the first thread, the computer program comprising:

computer program code for saving a snapshot of an indication of a state of the first thread and thereafter setting the state of the first thread to a safe state, wherein the indication of the state of which the snapshot is saved is an indication of whether or not the first thread was consistent;

computer program code for acquiring a consistent state lock using the first thread;

computer program code for identifying substantially all threads that are inconsistent, the inconsistent threads being included in the multiple threads;

computer program code for altering the state of the substantially all threads that are inconsistent to a consistent state;

computer program code for notifying the first thread when the state of the substantially all threads that are inconsistent have been altered to be consistent;

computer program code for restoring the indication of the state of the first thread from the snapshot; and computer program code for releasing the consistent state lock using the first thread.

8. A computer readable medium as recited in claim 7, the computer program embodied thereon further comprising:

computer program code for performing a garbage collection after releasing the consistent state lock using the first thread.

9. A computer readable medium as recited in claim 8, the computer program embodied thereon further comprising:

computer program code for notifying the substantially all threads that have been altered to be consistent that the garbage collection has been performed.

* * * * *

UNITED STATES PATENT AND TRADEMARK OFFICE
CERTIFICATE OF CORRECTION

PATENT NO. : 7,086,053 B2  Page 1 of 1
APPLICATION NO. : 09/836931
DATED : August 1, 2006
INVENTOR(S) : Long et al.

It is certified that error appears in the above-identified patent and that said Letters Patent is hereby corrected as shown below:

In line 2 of claim 5 (column 11, line 33) change "farther comprising" to --further comprising--.

Signed and Sealed this

Twenty-first Day of November, 2006

JON W. DUDAS
*Director of the United States Patent and Trademark Office*